(12) United States Patent
Demirovic et al.

(10) Patent No.: US 10,647,222 B2
(45) Date of Patent: May 12, 2020

(54) SYSTEM AND METHOD TO RESTRICT VEHICLE SEAT MOVEMENT

(71) Applicant: GM GLOBAL TECHNOLOGY OPERATIONS LLC, Detroit, MI (US)

(72) Inventors: Orhan Demirovic, Sterling Heights, MI (US); Mingyang Yang, Sterling Heights, MI (US); Bongkyu Park, Rochester, MI (US); Jaywan Kim, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 281 days.

(21) Appl. No.: 15/950,310

(22) Filed: Apr. 11, 2018

(65) Prior Publication Data

US 2019/0315248 A1 Oct. 17, 2019

(51) Int. Cl.
*B60N 2/02* (2006.01)
*B60N 2/30* (2006.01)

(52) U.S. Cl.
CPC .......... *B60N 2/0244* (2013.01); *B60N 2/3011* (2013.01); *B60N 2002/0268* (2013.01)

(58) Field of Classification Search
CPC .................. B60N 2/002; B60N 2/0232; B60N 2002/0272; B60N 2002/0268; B60N 2/0244; B60N 2002/2815; B60N 2/2869
See application file for complete search history.

(56) References Cited

U.S. PATENT DOCUMENTS

| 10,343,555 B2 * | 7/2019 | Tan .......................... B60N 2/06 |
| 2008/0042409 A1 * | 2/2008 | Breed .................. B60R 21/0134 280/735 |
| 2008/0312797 A1 * | 12/2008 | Takehisa .............. B60N 2/0244 701/49 |
| 2009/0033075 A1 * | 2/2009 | Yoshifuku ......... B60R 21/01538 280/730.1 |

(Continued)

FOREIGN PATENT DOCUMENTS

KR    101696258 B1 *  1/2017

OTHER PUBLICATIONS

Esposito, Empty Vehicle Detection with Video Analytics, www.researchgate.net/publication/295104552_Empty_Vehicle_Detection_with_Video_Analytics, Sep. 2013 (Year: 2013).*

*Primary Examiner* — Mike Anderson
*Assistant Examiner* — Scott R Jagolinzer (57) ABSTRACT

A system to limit adjustment capabilities of a vehicle seat, the system including: a controller; a camera located in a vehicle configured to record images of a visual content, where the visual content is at least a portion of the vehicle seat; the vehicle seat being capable of being remotely controlled to be adjusted between an upright arrangement and a folded arrangement; a sensor configured to produce an output when a seatbelt tongue is inserted into a corresponding seatbelt buckle; where executable instructions enable the controller to: operate the camera to record images of the visual content; determine whether an object exists in the visual content; determine whether the sensor has produced (Continued)

an output; and when at least one object exists in the visual content or the sensor has produced an output, limit the vehicle seat adjustment capabilities such that the vehicle seat is restricted to the upright arrangement.

17 Claims, 6 Drawing Sheets

(56) References Cited

U.S. PATENT DOCUMENTS

| | | | |
|---|---|---|---|
| 2016/0280095 A1* | 9/2016 | Frye | B60N 2/0244 |
| 2017/0057379 A1* | 3/2017 | Wang | B60N 2/0244 |
| 2017/0124987 A1* | 5/2017 | Kim | B60R 11/04 |
| 2018/0111511 A1* | 4/2018 | Lota | B60N 2/0244 |
| 2018/0272977 A1* | 9/2018 | Szawarski | B60R 21/01512 |
| 2019/0309721 A1* | 10/2019 | Siddiqui | F02N 11/0814 |

* cited by examiner

SYSTEM AND METHOD TO RESTRICT VEHICLE SEAT MOVEMENT

INTRODUCTION

Many vehicle seats in the second or third row can be folded forward to provide for additional room at or near the vehicle's rear cargo area. Moreover, many vehicles provide for the remote activation and folding of these seats for the sake of convenience. Such remote seat folding may be operated through a vehicle-installed telematics unit or by way of the telematics unit being in collaboration with an electronics control unit (ECU).

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system to limit adjustment capabilities of a vehicle seat, the system including: a memory configured to include one or more executable instructions; a controller configured to execute the executable instructions; a camera located in a vehicle configured to record images of a visual content, where the visual content is at least a portion of the vehicle seat; the vehicle seat being capable of being remotely controlled to be adjusted between an upright arrangement and a folded arrangement; a sensor configured to produce an output when a seatbelt tongue is inserted into a corresponding seatbelt buckle; where the executable instructions enable the controller to: operate the camera to record one or more images of the visual content; determine whether at least one object exists in the visual content; determine whether the sensor has produced an output; and when at least one object exists in the visual content or the sensor has produced an output, limit the vehicle seat adjustment capabilities such that the vehicle seat is restricted to the upright arrangement. Other embodiments of this aspect include corresponding computer systems, apparatus, and computer programs recorded on one or more computer storage devices, each configured to perform the actions of the methods.

Implementations may include one or more of the following features. The system where the executable instructions further enable the controller to adjust the vehicle seat from the upright arrangement to the folded arrangement, when no objects exist in the visual content and the sensor has not produced an output. The system where the vehicle seat adjustment capabilities are limited by the vehicle seat being transitioned from an energized state to a deenergized state. The system where the controller determines whether the sensor has produced an output only after it is determined that no objects exist in the visual content. The system further including a display configured to exhibit information and where the executable instructions further enable the controller to, when at least one object exists in the visual content or the sensor has produced an output, operate the display to exhibit a notification. The system further including an audio system configured to provide audio output and where the executable instructions further enable the controller to, when at least one object exists in the visual content or the sensor has produced an output, operate the audio system to generate an audio notification. The system where the object is a vehicle passenger. Implementations of the described techniques may include hardware, a method or process, or computer software on a computer-accessible medium.

One general aspect includes a method to limit adjustment capabilities of a vehicle seat, the method including: providing a memory configured to include one or more executable instructions; providing a controller configured to execute the executable instructions; providing a camera located in a vehicle configured to record images of a visual content, where the visual content is at least a portion of the vehicle seat; providing a recognition module in the memory, the recognition module configured to identify whether at least one object exists in the visual content; providing the vehicle seat capable of being remotely controlled to be adjusted between an upright arrangement and a folded arrangement; providing a sensor configured to produce an output when a seatbelt tongue is inserted into a corresponding seatbelt buckle; operating (via the controller) the camera to record one or more images of the visual content; performing (via the controller) the recognition module to identify whether at least one object exists in the visual content; determining (via the controller) whether the recognition module has identified that at least one object exists in the visual content; determining (via the controller) whether the sensor has produced an output; and when the recognition module has identified that at least one object exists in the visual content or the sensor has produced an output, limiting (via the controller) the vehicle seat adjustment capabilities such that the vehicle seat is restricted to the upright arrangement. Other embodiments of this aspect include corresponding computer systems, apparatus, and computer programs recorded on one or more computer storage devices, each configured to perform the actions of the methods.

Implementations may include one or more of the following features. The method further including physically adjusting (via the controller) the vehicle seat from the upright arrangement to the folded arrangement, when the recognition module has identified that no objects exist in the visual content and the sensor has not produced an output. The method where the vehicle seat adjustment capabilities are limited (via the controller) by the vehicle seat being transitioned from an energized state to a deenergized state. The method where the controller determines whether the sensor has produced an output only after the recognition module has identified that no objects exist in the visual content. The method further including providing a display configured to exhibit information and, when the recognition module has identified that at least one object exists in the visual content or the sensor has produced an output, operating (via the controller) the display to exhibit a notification. The method further including providing an audio system configured to provide audio output, and when the recognition module has identified that at least one object exists in the visual content or the sensor has produced an output, operating (via the controller) the audio system to generate an audio notification. The method where the object is a vehicle passenger. Implementations of the described techniques may include hardware, a method or process, or computer software on a computer-accessible medium.

One general aspect includes a non-transitory and machine-readable medium having stored thereon one or more executable instructions to limit adjustment capabilities of a vehicle seat, which when provided to at least one machine and executed thereby, causes the machine to: operate a vehicle interior camera to record one or more images of at least a portion of the vehicle seat; perform a recognition module to identify whether at least one object is resting on at least a portion of the vehicle seat; determine whether the recognition module has identified that at least one object is resting on at least a portion of the vehicle seat; determine whether a sensor has produced an output, where the sensor is configured to produce an output when a seatbelt tongue is inserted into a corresponding seatbelt buckle; and when the recognition module has identified that at least one object is resting on at least a portion of the vehicle seat or the sensor has produced an output, limit the vehicle seat adjustment capabilities such that the vehicle seat is restricted to an upright arrangement, where the vehicle seat is capable of being remotely controlled to be adjusted between an upright arrangement and a folded arrangement. Other embodiments of this aspect include corresponding computer systems, apparatus, and computer programs recorded on one or more computer storage devices, each configured to perform the actions of the methods.

Implementations may include one or more of the following features. The non-transitory and machine-readable medium further including, when the recognition module has identified that no objects are resting on at least a portion of the vehicle seat and the sensor has not produced an output, adjust the vehicle seat from the upright arrangement to a folded arrangement. The non-transitory and machine-readable medium where the vehicle seat adjustment capabilities are limited by the vehicle seat being transitioned from an energized state to a deenergized state. The non-transitory and machine-readable medium where the machine determines whether the sensor has produced an output only after the recognition module has identified that no objects are resting on at least a portion of the vehicle seat. The non-transitory and machine-readable medium further including, when the recognition module has identified that at least one object is resting on at least a portion of the vehicle seat or the sensor has produced an output, operate a display to exhibit a notification. The non-transitory and machine-readable medium further including, when the recognition module has identified that at least one object is resting on at least a portion of the vehicle seat or the sensor has produced an output, operate an audio system to generate an audio notification. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiment(s). As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
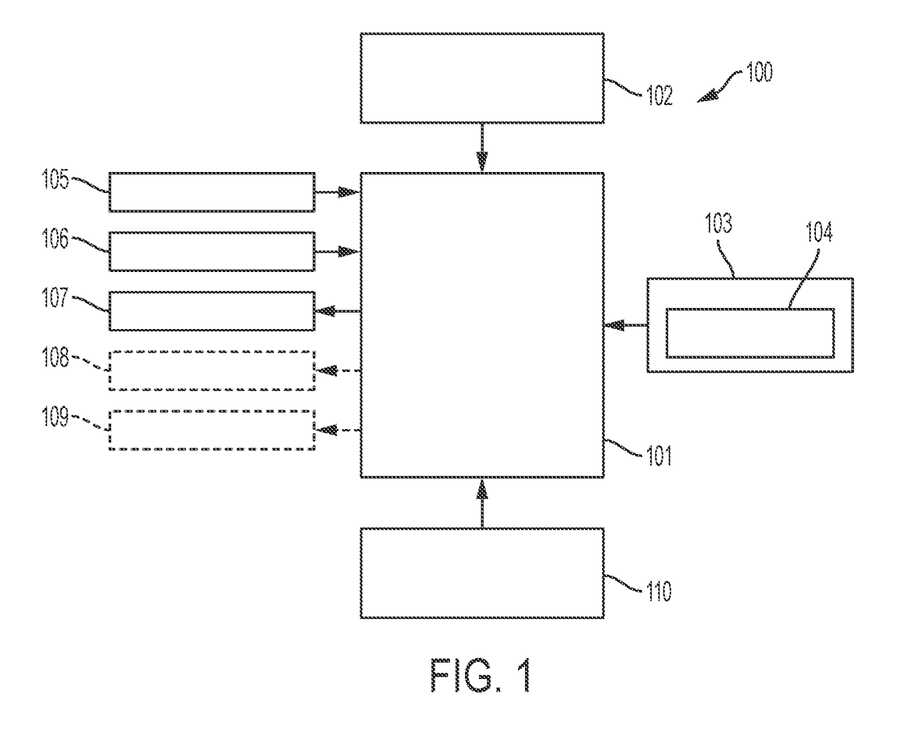
FIG. 1 shows an exemplary block diagram of an exemplary embodiment of a system to restrict vehicle seat movement.

Referring to the drawings in detail, and specifically to FIG. 1, a block diagram of an exemplary system to restrict vehicle seat movement is generally indicated by reference numeral 100. As shown, the disclosed system 100 includes a controller 101, a power supply 102, a memory 103, one or more cameras 105, one or more seatbelt sensors 106, and one or more vehicle seats 107. System 100 may further include a display 108, an audio system 109 and communication device 110. However, system 100 is not limited to the aforementioned configuration and may be configured to include additional elements and/or omit one or more of the aforementioned elements.

Controller 101 can be located in a vehicle telematics unit and controller 101 essentially controls the overall operation and function of system 100. Upon reading and executing one or more executable instructions, controller 101 may control, send, and/or receive information from one or more of memory 103, one or more cameras 105, one or more seatbelt sensors 106, one or more vehicle seats 107, and communication device 110 of system 100. The controller 101 may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components.

Power supply 102 provides power to one or more of the controller 101, memory 103, the one or more cameras 105, the one or more seatbelt sensors 106, the one or more vehicle seats 107, display 108, audio system 109, and communication device 110. The power supply 102 may include one or more from a battery, an outlet, a capacitor, a solar energy cell, a generator, a wind energy device, an alternator, etc.

Memory 103 can be located in a vehicle telematics unit and is configured for recording information, storing information, and retrieving information used by system 100. Memory 103 may include the executable instructions configured to be read and executed by controller 101 so as to perform the functions of system 100. Memory 103 may also be controlled by controller 101 to record, store, and retrieve various types of data in databases such as, but not limited to, storing and retrieving mapping data in a recognition module 104.

Memory 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The recognition module 104 in memory 103 may act as an object identification software program that can be performed to identify whether one or more objects (e.g., groceries, vehicle passengers, luggage, boxes, etc.) exist in a visual content (e.g., on the seat cushion of a vehicle seat). For example, image recognition module 104 can implement one or more of the generally known image recognition (processing) techniques such as, but not limited to, cascading classifier techniques, Maximally Stable Extremal Region (MSER) techniques, and Optical Character Recognition (OCR) techniques to support object identification. Image recognition module may also correspond with an image database, having examples of objects (e.g., pictures of aspects of groceries, vehicle passengers, luggage, boxes, etc.), for the purposes of matching one or more visual-content-identified objects. Skilled artists will see that each of these image recognition (processing) techniques can be used sequentially to identify whether one or more objects exist in the visual content. For example, (in an exemplary first process step) the MSER techniques may be used for blob detection and/or region detection of the visual content, (in an exemplary second process step) the cascading classifier techniques may be used for facial detection in the visual content, and (in an exemplary third process step) the OCR techniques may be used to detect any text in the visual content. Moreover, if one or more objects are identified as existing in the visual content, recognition module 104 may produce an output to acknowledge an object has been identified; otherwise, recognition module 104 may produce an output that recognizes no objects exist in the visual content. This output may also be binary in nature (e.g., a "1" indicates one or more objects have been identified to exist in the visual content and a "0" indicates no objects have been identified to exist in the visual content).

Figure 2:
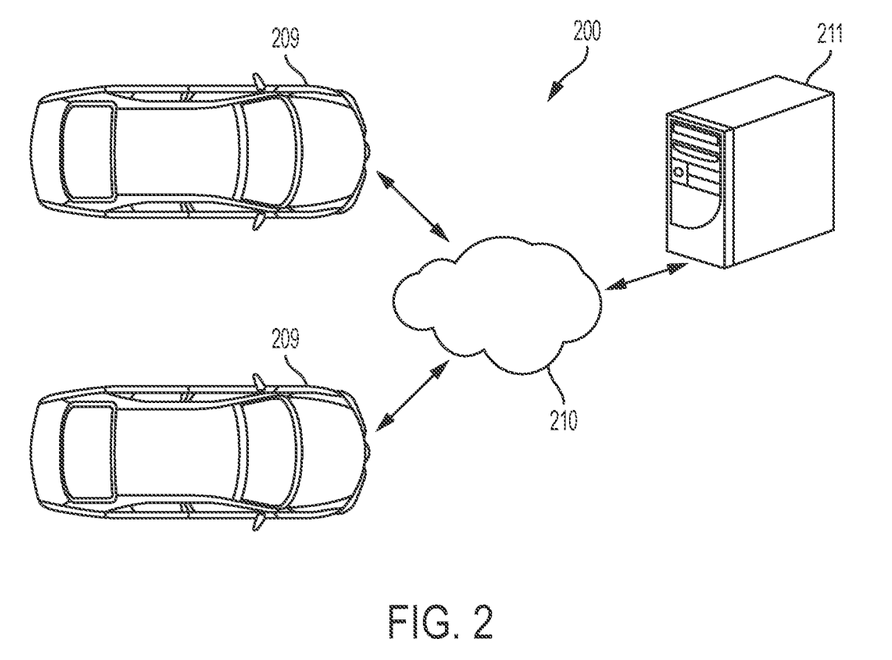
FIG. 2 shows an exemplary diagram of an exemplary system to restrict vehicle seat movement.

Communication device 110 may be used by system 100 to communicate with various types of external, remote parties (FIG. 2). Communication device 110 may be used to send/receive certain communications such as, but not limited to, executable instructions/executable instruction updates for the recognition module 104 (e.g., software/software updates) and image database. These communications may be sent to remote parties such as, but not limited to, a call center, a computing device, or a mobile computing device. New or developed recognition module data, executable instructions, and image database updates may also be downloaded from the call center, one or more computing devices, or one or more mobile computing devices via communication device 110.

The communication device 110 may include various peripheral communication modules of executable instructions. Such modules may include, but are not limited to, a GPS module, a broadcast receiving module, a near field communication (NFC) module, a wired communication module, and a wireless communication module. The broadcast receiving module may include a terrestrial broadcast receiving module including an antenna to receive a terrestrial broadcast signal, a demodulator, and an equalizer. The NFC module is a module that communicates with an external apparatus located at a nearby distance according to an NFC method. The GPS module is a module that receives a GPS signal from one or more GPS satellites of a satellite constellation and detects a current location. The wired communication module may be a module that receives information over a wired network such as a local area network, a controller area network (CAN), or an external network, via Ethernet cable, fiber optic cable, coaxial cable, etc. The wireless communication module is a module that is connected to an external network by using a wireless communication protocol such as Wi-Fi or IEEE communication protocol and communicates with the external network. The wireless communication module may further include a mobile communication module that accesses a mobile communication network and performs communication according to various mobile communication standards such as 4th generation (4G), 3rd generation partnership project (3GPP), long term evolution (LTE), Bluetooth, Bluetooth Low Energy (BLE), or ZigBee. Skilled artisans will understand that communication device 110 may use one or more of these peripheral modules (or other modules not discussed herein) to send/receive the developed topographical data.

Figure 4:
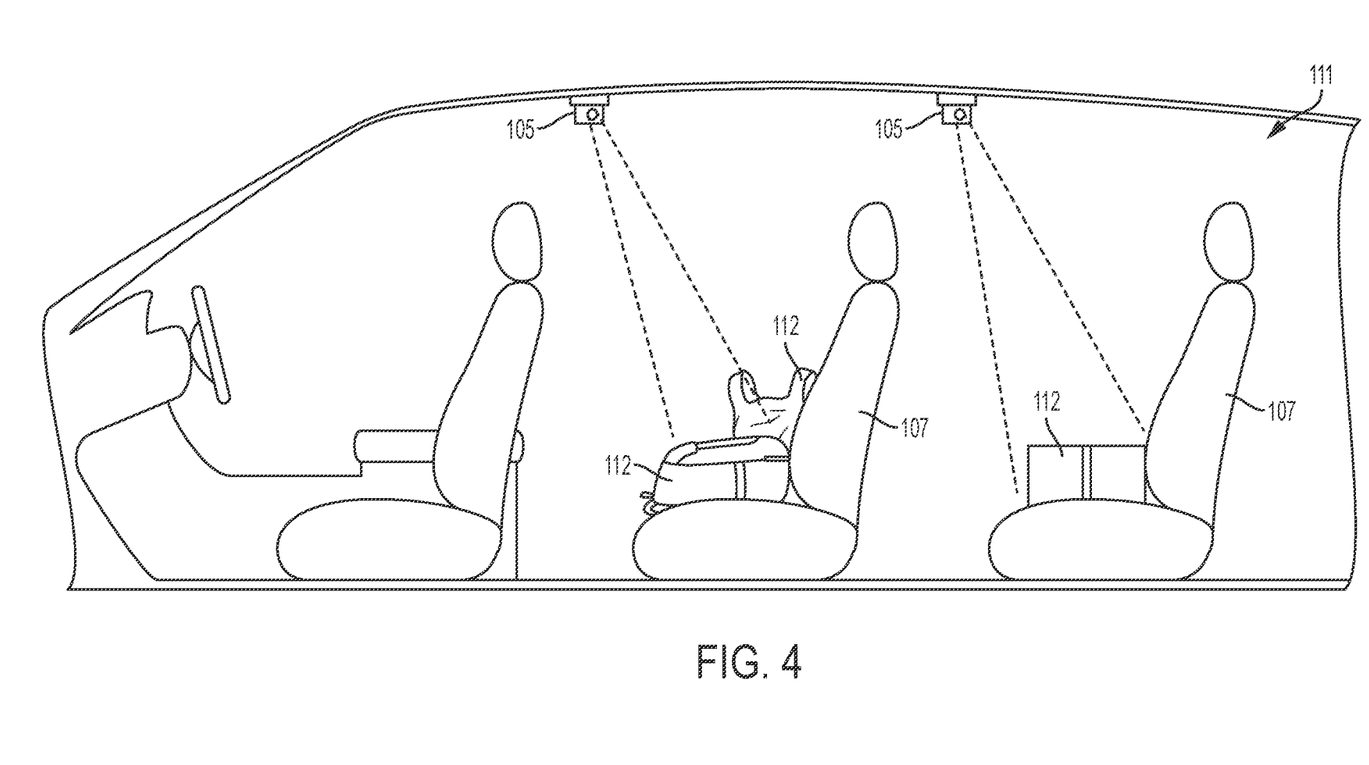
FIG. 4 shows one or more aspects of the exemplary system to restrict vehicle seat movement being implemented in an exemplary vehicle environment.

Each of the one or more cameras 105 may be a digital camera and may be installed on the ceiling of the vehicle's interior cabin 111, as can be seen with additional reference to FIG. 4. As such, each camera 105 may include the ability to record one or more digital images as bitmapped data representations of tangible objects captured and stored by generally known operations of the camera. As shown, one of the cameras 105 may be positioned to view and record one or more images of at least the seat cushions of the second-row seats and another camera 105 may be positioned to view and record one or more images of at least the seat cushions of the third-row vehicle seats. Skilled artists will see that each camera 105 may be similar to those cameras generally known to be installed on the vehicle's dashboard and trunk door.

Figure 5:
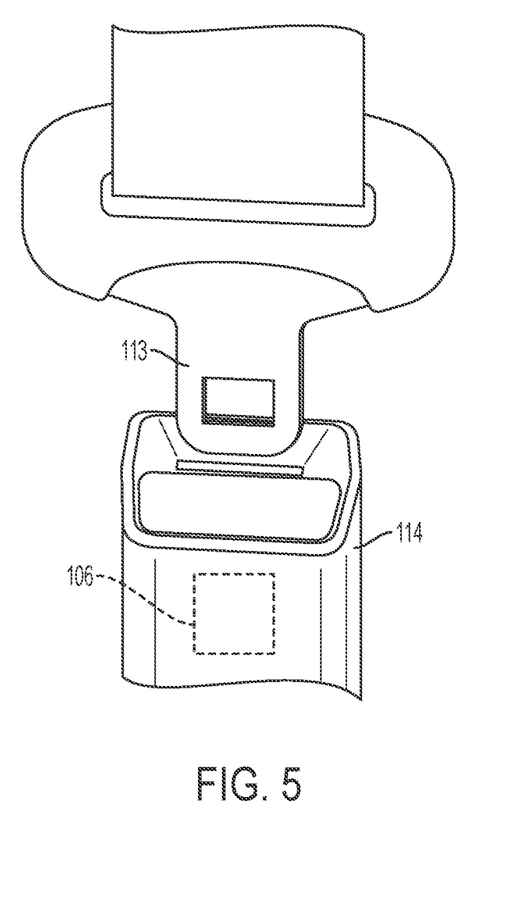
FIG. 5 shows one or more other aspects of the exemplary system to restrict vehicle seat movement being implemented in an exemplary vehicle environment.

Each seatbelt sensor 106 may be connected with a corresponding vehicle seatbelt within the vehicle. Seatbelt sensor 106 is configured to sense for certain changes occurring when the seatbelt is engaged (i.e., being used for its proper purposes). For example, the connected seatbelt sensor 106 can detect when a seatbelt tongue 113 on the seatbelt has been inserted into the respective seatbelt buckle 114, as can bee seen with additional reference to FIG. 5. After such an engagement has occurred, the attached seatbelt sensor 106 may send an unambiguous seatbelt-engagement signal to controller 101 (an "output"). This signal may also be binary in nature (e.g., a "1" indicates the seatbelt tongue is inserted into the corresponding seatbelt buckle and a "0" indicates the seatbelt is not being engaged).

The one or more vehicle seats 107 may be located at the second row or third row of the vehicle interior cabin. Each vehicle seat 107 includes a seat cushion and a seatback pivotably coupled to the seat cushion as well as positionally defaulted to be substantially perpendicular with respect to the seat cushion. Each vehicle seat 107 can moreover be controlled by controller 101 to be adjusted to an upright arrangement and a folded arrangement. As such, when in the upright arrangement, the seatback is substantially perpendicular to the seat cushion (e.g., 75 degrees relative to a horizontal axis) such that a passenger can be seated comfortably on the respective vehicle seat 107. However, when in the folded arrangement, the seatback is pivoted forward with respect to the seat cushion such that the seatback is pressed against and parallel with the seat cushion (i.e., to provide additional vertical space in the vehicle cabin and prevent a passenger from sitting on the vehicle seat 107). Such adjustments may be remotely activated and controlled by controller 101. Such adjustment capabilities may also be restricted so that the vehicle seat 107 is to remain stationary in the upright arrangement or to remain stationary in the folded arrangement. For example, controller 101 may remotely restrict vehicle seat movement by disabling power from power source 102 in the vehicle seat 107 (i.e., causing the vehicle seat 107 to transition from an energized state to a deenergized state). This may, for example, occur via a power switch located at or connected to the vehicle seat 107.

Display 108 may be located in the vehicle and may be preferably a graphics display, such as a touch screen on the vehicle instrument panel or a heads-up display reflected off of the vehicle's windshield, and can be used to provide a multitude of input and output functions (i.e., capable of GUI implementation). As such, the display 108 may be configured to exhibit information, for example, to present vehicle passengers with one or more notifications corresponding to one or more vehicle systems.

Audio system 109 may provide audio output to one or more vehicle passengers and can be a dedicated, stand-alone system or part of the primary vehicle audio system. According to the one or more embodiments, audio system 109 may provide AM, FM, media streaming services (e.g., PANDORA RADIO™, SPOTIFY™, etc.), satellite radio, CD, DVD, and other multimedia functionality. Audio system 109 may also generate at least one audio notification to announce information being exhibited on display 108 and/or may generate an audio notification which independently announces information. An audio notification may, for example, announce to vehicle passengers one or more notifications corresponding to one or more vehicle systems.

Figure 6:
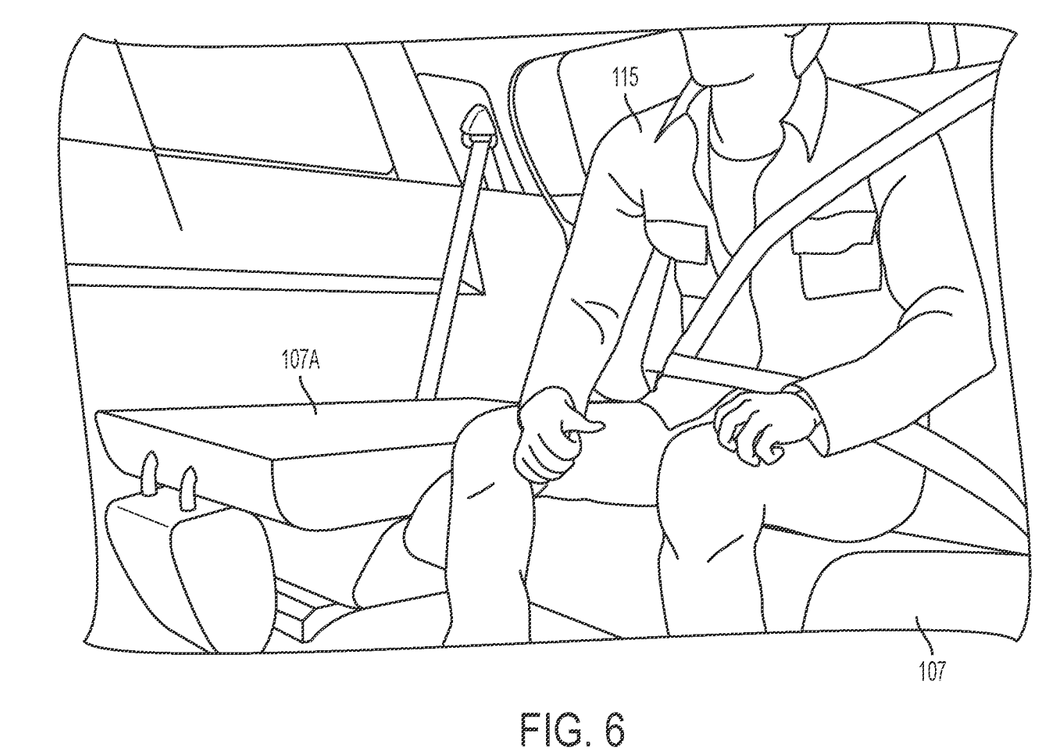
FIG. 6 shows an one or more other aspects of the exemplary system to restrict vehicle seat movement being implemented in an exemplary vehicle environment.

According to an exemplary aspect, controller 101 is configured to operate the one or more cameras 105 to record one or more images of at least a portion of one or more vehicle seats 107. For example, upon a command to fold one of the one or more vehicle seats 107, controller 101 may operate the camera 105 that can record one or more images of the seat cushion for that vehicle seat 107. Controller 101 is further configured to perform the recognition module 104 to identify whether at least one object is resting on at least a portion of the one or more vehicle seats 107 (i.e., existing in the visual content). For example, recognition module 104 may implement image recognition techniques to determine if a vehicle passenger 115 (FIG. 6) is sitting on the vehicle seat 107 or some other kind of object 112 (FIG. 4), e.g., groceries, sports equipment, toys, tools, etc., is resting on the seat cushion of the vehicle seat 107. Controller 101 is further yet configured to determine whether recognition module 104 has identified one or more objects exist in the visual content. For example, controller 101 may determine if it has received an output from recognition module 104 that indicates a person/object is on the vehicle seat 107 (e.g., a binary output). Controller 101 is further yet configured to determine if the corresponding seatbelt sensor 106 has produced an output. (This determination may be conducted only after the controller 101 has determined the recognition module 104 indicates no objects exist in the visual content.) For example, controller 101 may determine if it has received an output from the sensor 106, which corresponds to the vehicle seat 107 being commanded to fold, that indicates a seatbelt tongue has been inserted into its corresponding seatbelt buckle. Controller 101 is further yet configured to limit the seat adjustment, such that the vehicle seat is restricted to the upright arrangement, when the recognition module 104 has identified that at least one object exists in the visual content or the sensor has produced an output. For example, controller 101 may transition the vehicle seat 107 from an energized state to a deenergized state (i.e., by removing power from the seat). Controller 101 is further yet configured physically adjust the vehicle seat 107 from the upright arrangement to the folded arrangement, when the recognition module 104 has identified that no objects exist in the visual content and the sensor has not produced an output. An exemplary vehicle seat 107A in an exemplary folded arrangement can be seen in FIG. 6.

In one or more embodiments, Controller 101 can even further be configured to operate display 108 to exhibit a notification, when the recognition module has identified that at least one object exists in the visual content or the sensor has produced an output. For example, controller 101 may produce a textual notification on the display 108 that states: "THE SEAT CAN NOT BE FOLED AT THIS TIME." Controller 101 can even further be configured to operate audio system 109 to generate an audio notification, when the recognition module has identified that at least one object exists in the visual content or the sensor has produced an output. For example, controller 101 may produce an audio announcement, to be heard by one or more vehicle passengers in the vehicle interior cabin via audio system 109, that states: "THE SEAT CAN NOT BE FOLED AT THIS TIME."

FIG. 2 shows a diagram of system 200 to limit adjustment capabilities of a vehicle seat 107, according to an exemplary aspect. Referring to FIG. 2, vehicles 209 may also implement their communication device 110 to transmit and receive communications (information) over network 210 to and from their memory 103 (discussed above) generally located within a remote server 211 (i.e., remote party, for example, a call center). The communications that may be transmitted or received or both transmitted and received by one or more vehicles 209 may include, but is not limited to, executable instructions/executable instruction updates for the recognition module 104 and image database. In order to transmit and receive communications over network 210 as well as perform the functions that implement the recognition module 104, vehicles 209 or server 211 or both vehicles 209 and server 211 may include one or more controllers 101 configured to execute instructions for the recognition module 104 as stored in memory 103 of server 211.

Figure 3:
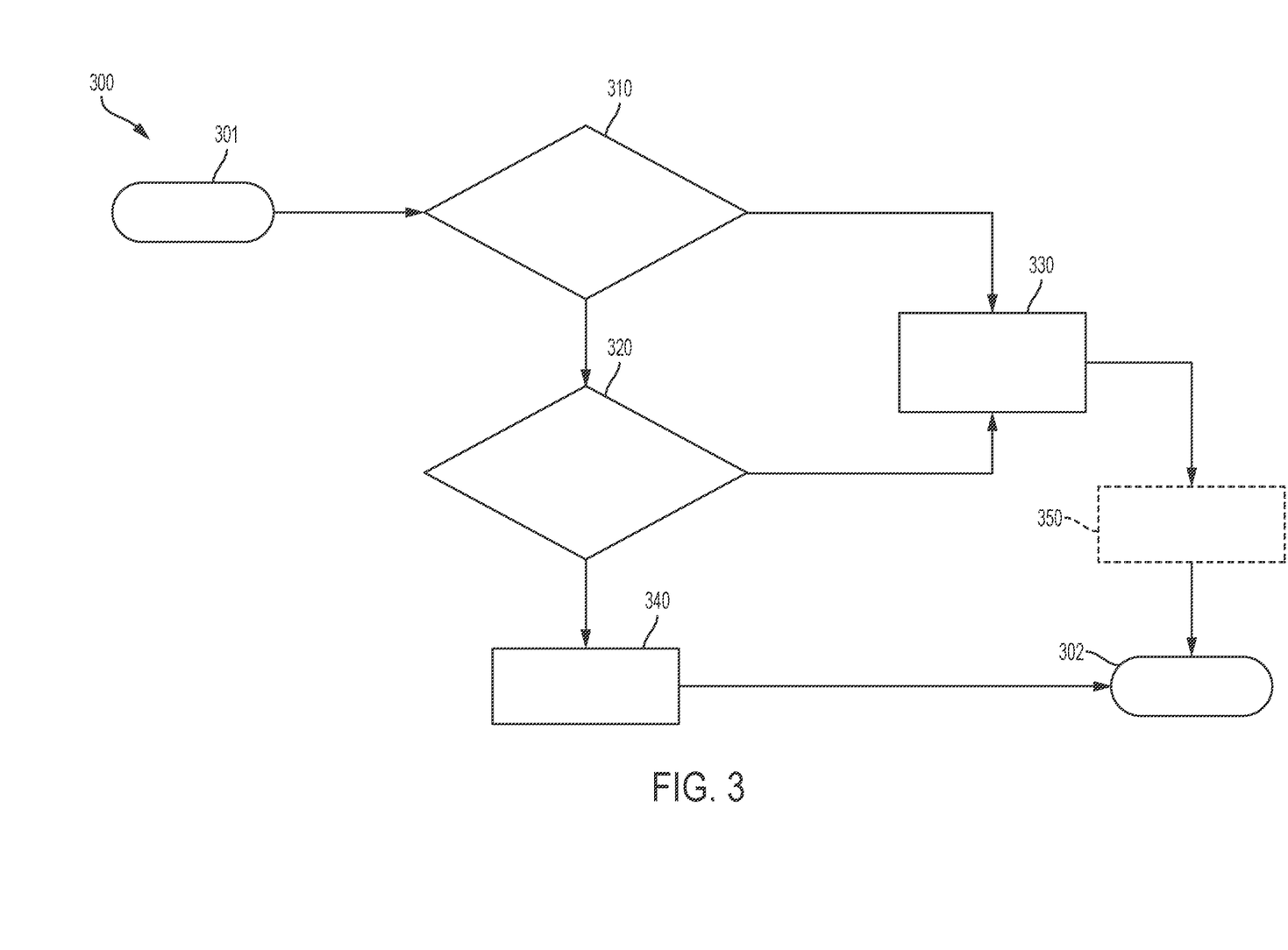
FIG. 3 shows a flow chart generally illustrating another exemplary method that may be performed to restrict vehicle seat movement.

FIG. 3 shows an exemplary method 300 to limit adjustment capabilities of a vehicle seat 107, according to an exemplary aspect. Method 300 may begin at 301 in which an adjustment command has been provided to fold one of the one or more vehicle seats 107. This command may originate from controller 101 (upon an input via, for example, display 108) or from an electronics control unit (ECU). At step 310, controller 101 operates the respective camera 105 to record an image of the vehicle seat 107. In this step, controller 101 also performs recognition module 104 and determine whether the recognition module 104 has identified an object exists in the visual content. If an object is detected, method 300 will move to step 330; otherwise, method 300 will to step 320. In step 320, controller 101 will determine whether the seatbelt sensor 106 has produced an output. If it is determined that an output has been produced method 300 will move to 330; otherwise, method 300 will move to step 340. In step 330, controller 101 will, at least temporarily, limit the vehicle seat adjustment capabilities in such a way that the respective vehicle seat 107 is restricted to being in the unfolded arrangement (e.g., by preventing power from being delivered to the seat). After step 330, method 300 may optionally move to step 350. In optional step 350, controller 101 will operate display 108 to exhibit a notification and/or operate audio system 109 to generate an audio notification, each of which being designed to inform one or more vehicle passengers that adjustment command cannot be carried out. Alternatively, in step 340, since no objects have been detected nor has the seatbelt sensor 106 produced an output, controller 101 will allow the adjustment command to be carried out by causing physical adjustment of the vehicle seat 107 from its defaulted upright arrangement to the folded arrangement (i.e., remote adjustment of the seat from one state to another). Upon the conclusion of either step 330 (or optional step 350) or step 340, method 300 will move to completion 302.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A system to limit adjustment capabilities of a vehicle seat, the system comprising:
    a memory configured to comprise one or more executable instructions;
    a controller configured to execute the executable instructions;
    a camera located in a vehicle configured to record images of a visual content, wherein the visual content is at least a portion of the vehicle seat;
    the vehicle seat being capable of being remotely controlled to be adjusted between an upright arrangement and a folded arrangement;
    a sensor configured to produce an output when a seatbelt tongue is inserted into a corresponding seatbelt buckle;
    wherein the executable instructions enable the controller to:
    operate the camera to record one or more images of the visual content;
    determine whether at least one object exists in the visual content;
    after it has been determined that no objects exist in the visual content, determine whether the sensor has produced the output; and
    when at least one object exists in the visual content or the sensor has produced the output, limit the vehicle seat adjustment capabilities such that the vehicle seat is restricted to the upright arrangement.

2. The system of claim 1, wherein the executable instructions further enable the controller to adjust the vehicle seat from the upright arrangement to the folded arrangement, when no objects exist in the visual content and the sensor has not produced the output.

3. The system of claim 1, wherein the vehicle seat adjustment capabilities are limited by the vehicle seat being transitioned from an energized state to a deenergized state.

4. The system of claim 1, further comprising:
    a display configured to exhibit information; and
    wherein the executable instructions further enable the controller to:
    when at least one object exists in the visual content or the sensor has produced the output, operate the display to exhibit a notification.

5. The system of claim 1, further comprising:
    an audio system configured to provide audio output; and
    wherein the executable instructions further enable the controller to:
    when at least one object exists in the visual content or the sensor has produced the output, operate the audio system to generate an audio notification.

6. The system of claim 1, wherein the object is a vehicle passenger.

7. A method to limit adjustment capabilities of a vehicle seat, the method comprising:
    providing a memory configured to comprise one or more executable instructions;
    providing a controller configured to execute the executable instructions;
    providing a camera located in a vehicle configured to record images of a visual content, wherein the visual content is at least a portion of the vehicle seat;
    providing a recognition module in the memory, the recognition module configured to identify whether at least one object exists in the visual content;
    providing the vehicle seat capable of being remotely controlled to be adjusted between an upright arrangement and a folded arrangement;
    providing a sensor configured to produce an output when a seatbelt tongue is inserted into a corresponding seatbelt buckle;
    operating (via the controller) the camera to record one or more images of the visual content;

performing (via the controller) the recognition module to identify whether at least one object exists in the visual content;

determining (via the controller) whether the recognition module has identified that at least one object exists in the visual content;

after the recognition module has identified that no objects exist in the visual content, determining (via the controller) whether the sensor has produced the output; and when the recognition module has identified that at least one object exists in the visual content or the sensor has produced the output, limiting (via the controller) the vehicle seat adjustment capabilities such that the vehicle seat is restricted to the upright arrangement.

8. The method of claim 7, further comprising physically adjusting (via the controller) the vehicle seat from the upright arrangement to the folded arrangement, when the recognition module has identified that no objects exist in the visual content and the sensor has not produced the output.

9. The method of claim 7, wherein the vehicle seat adjustment capabilities are limited (via the controller) by the vehicle seat being transitioned from an energized state to a deenergized state.

10. The method of claim 7, further comprising:
providing a display configured to exhibit information; and
when the recognition module has identified that at least one object exists in the visual content or the sensor has produced the output, operating (via the controller) the display to exhibit a notification.

11. The method of claim 7, further comprising:
providing an audio system configured to provide audio output; and
when the recognition module has identified that at least one object exists in the visual content or the sensor has produced the output, operating (via the controller) the audio system to generate an audio notification.

12. The method of claim 7, wherein the object is a vehicle passenger.

13. A non-transitory and machine-readable medium having stored thereon one or more executable instructions to limit adjustment capabilities of a vehicle seat, which when provided to at least one machine and executed thereby, causes the machine to:

operate a vehicle interior camera to record one or more images of at least a portion of the vehicle seat;

perform a recognition module to identify whether at least one object is resting on at least a portion of the vehicle seat;

determine whether the recognition module has identified that at least one object is resting on at least a portion of the vehicle seat;

after the recognition module has identified that no objects are resting on at least a portion of the vehicle seat, determine whether a sensor has produced an output, wherein the sensor is configured to produce the output when a seatbelt tongue is inserted into a corresponding seatbelt buckle; and when the recognition module has identified that at least one object is resting on at least a portion of the vehicle seat or the sensor has produced the output, limit the vehicle seat adjustment capabilities such that the vehicle seat is restricted to an upright arrangement, wherein the vehicle seat is capable of being remotely controlled to be adjusted between an upright arrangement and a folded arrangement.

14. The non-transitory and machine-readable medium of claim 13, further comprising, when the recognition module has identified that no objects are resting on at least a portion of the vehicle seat and the sensor has not produced the output, adjust the vehicle seat from the upright arrangement to the folded arrangement.

15. The non-transitory and machine-readable medium of claim 13, wherein the vehicle seat adjustment capabilities are limited by the vehicle seat being transitioned from an energized state to a deenergized state.

16. The non-transitory and machine-readable medium of claim 13, further comprising, when the recognition module has identified that at least one object is resting on at least a portion of the vehicle seat or the sensor has produced the output, operate a display to exhibit a notification.

17. The non-transitory and machine-readable medium of claim 13, further comprising, when the recognition module has identified that at least one object is resting on at least a portion of the vehicle seat or the sensor has produced the output, operate an audio system to generate an audio notification.

* * * * *